United States Patent
Kurtz et al.

(10) Patent No.: US 7,652,617 B2
(45) Date of Patent: Jan. 26, 2010

(54) RADAR MICROSENSOR FOR DETECTION, TRACKING, AND CLASSIFICATION

(75) Inventors: James Lynn Kurtz, Gainesville, FL (US); Philip Russell Carlson, Gainesville, FL (US); Charles Henry Overman, IV, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 110 days.

(21) Appl. No.: 11/809,707

(22) Filed: Jun. 1, 2007

(65) Prior Publication Data

US 2008/0106460 A1    May 8, 2008

Related U.S. Application Data

(60) Provisional application No. 60/838,858, filed on Aug. 18, 2006, provisional application No. 60/810,487, filed on Jun. 1, 2006.

(51) Int. Cl.
*G01S 13/00* (2006.01)
(52) U.S. Cl. .................. 342/76; 342/64; 342/104
(58) Field of Classification Search ............ 342/76, 342/64, 104
See application file for complete search history.

(56) References Cited

U.S. PATENT DOCUMENTS 5,589,929 A    12/1996    Li 6,801,155 B2 *    10/2004    Jahangir et al. ............... 342/90
6,972,710 B2    12/2005    Matsubara et al.
2003/0085992 A1 *    5/2003    Arpa et al. .................... 348/47

OTHER PUBLICATIONS

Kulpa, K., "Continuous Wave Radars—Monostatic, Multistatic and Network" *NATO Advanced Study Institute—Advances in Sensing with Security Applications*, Jul. 17-30, 1995, II Ciocco, Italy.

* cited by examiner

*Primary Examiner*—Thomas H Tarcza
*Assistant Examiner*—Timothy A Brainard
(74) *Attorney, Agent, or Firm*—Saliwanchik, Lloyd & Saliwanchik

(57) ABSTRACT

Embodiments pertain to methods of improving the performance of a frequency modulation continuous wave (FMCW) radar system and improving the value of the information provided the FMCW system. In an embodiment, the IF level is monitored while sweeping the frequency of the system through at least a portion of the frequency range of the system and the frequency is set to produce the minimum IF level. Embodiments expedite the adaptation of the comb filter to the signal when the system is turned on. In an embodiment, a method of quickly determining the largest peaks in the RDM is implemented. Embodiments relate to a method for processing a radar signal that classifies two or more targets. An embodiment classifies a human target or other target(s) using amplitude values in time-consecutive range-Doppler maps. An embodiment processes a radar signal for improving the performance of FMCW detection, tracking, and classification algorithms.

4 Claims, 7 Drawing Sheets

RADAR MICROSENSOR FOR DETECTION, TRACKING, AND CLASSIFICATION

CROSS-REFERENCE TO RELATED APPLICATIONS

The present application claims the benefit of U.S. Application Ser. No. 60/838,858, filed Aug. 18, 2006 and claims the benefit of U.S. Application Ser. No. 60/810,487, filed Jun. 1, 2006, both of which are hereby incorporated by reference herein in their entirety, including any figures, tables, or drawings.

The subject invention was made with government support under a research project supported by BAE/Army Research Laboratory, Advanced Sensors Collaborative Technology Alliance (Contract Nos. DAAD 19-01-2-0008 and DAAD 19-01-C-0068).

BACKGROUND OF INVENTION

Radar can be used to detect and track targets in a radar scene. Systems for such detecting and tracking can transmit an RF signal onto a radar scene and receive the reflected RF signal from targets and clutter. A common detection technique is homodyne detection. The received signal can then be processed, for example, via digital signal processing (DSP), after amplification and/or filtering, to provide data for detection and tracking of objects in the radar scene.

Radar systems can suffer from amplitude modulation (AM), which can be referred to as AM noise, on the received signal. Reduction of the AM noise can improve the performance of the radar system.

In radar systems for detecting and tracking targets, it can be important to quickly obtain meaningful detection and tracking information as quickly as possible after turning the system on. For example, there can be situations where the system is turned on only when a user determines a potential target may be in the radar scene. In this case, it is often advantageous to have the system provide detection and tracking to the user soon after turning the system on. Typical systems can incorporate a digital comb filter for adapting to the AM noise in order to reduce the AM noise. Such digital comb filters can take on the order of ten seconds to adapt to the AM noise signal and thus delay the system from providing the user meaningful detection and tracking information. It would be advantageous if the digital comb filter could adapt to the AM noise quicker.

A primary objective of a radar sensor is to maximize detection while simultaneously minimizing false alarms. Many radar sensors create range-Doppler maps (RDMs) in which the amplitude values of each cell represent potential target detects. When no targets are present in the sensor environment, the amplitude values in each cell are proportional to the noise and clutter background detected by the radar. What targets are present in the radar environment, these may appear in the cells of the range-Doppler map with somewhat larger amplitude, depending on the target size, distance from the radar and other factors. A radar system may utilize a digital signal processor (DSP) to perform the necessary signal processing tasks to create the RDM. This signal processing may be performed with fast Fourier transform (FFT) techniques or other techniques. In radar systems employing DSPs, computational power and memory may be limited.

Techniques to process the information in range-Doppler maps more efficiently and to provide data relevant to detection and tracking can improve the performance of radar systems for detection and tracking, for a given amount of computational power and memory.

Once a target is detected and/or tracked, it can be valuable to provide information to the user as to what type, or class, of target it is. Providing information as to the class of the target is often referred to as classification. A particular distinction that can be useful is to determine whether a target is a human being or a truck. Techniques for processing data obtained from a received RF signal in the radar system to provide more accurate classification of targets, for a given computational power and memory, can be valuable to the user.

BRIEF SUMMARY

The subject invention pertains to a frequency modulation continuous wave (FMCW) radar system. Embodiments relate to methods of improving the performance of such a FMCW system and improving the value of the information provided by such a FMCW system.

The block diagram in FIG. 1 shows an embodiment of a FMCW system 1 in accordance with the subject invention. The FMCW system processes a receive signal 5 after homodyne detection 3 in the RF circuitry. Amplification and filtering are done in the analog domain before the signal reaches the DSP 7. Amplification and filtering are done while minimizing noise, as the signal strengths are expected to be very low at longer ranges for the detection signal. The DSP can control all of the timing of the system so that all components run off the same system clock and are always in synchronism.

A key component of this system is the DSP 7. In a specific embodiment, this processor can do all of the Fast Fourier Transform (FFT) processing and can also do any other digital tasks required in the system. In an embodiment, the DSP is flexible and can be programmed quickly and easily. Before the DSP analyzes the receive signal, the receive signal is first amplified and then converted to a digital signal with an analog-to-digital converter (ADC) 9. A digital-to-analog converter (DAC) 11 in the system is used to implement a comb filter that helps to remove unwanted amplitude modulation on the received signal. Once the signal is input to the DSP, processing can be done to produce a range/velocity map. This range/velocity map can then be analyzed to detect targets. The results are sent from the DSP to a computer 13 so that they can be displayed and analyzed.

In an embodiment utilizing a frequency modulation continuous wave (FMCW) system, such as the system shown in FIG. 1, there is present in the mixer's intermediate frequency output (IF-output) remnants of the modulation frequency. These remnants are commonly referred to as amplitude modulation (AM) or AM noise. There are multiple causes for the AM signal, but common sources include mixer local oscillator (LO) to IF coupling, transmit antenna to receive antenna coupling, and reflections from nearby stationary clutter. The AM waveform shape is stable or slowly changing and is a function of the modulation frequency and its harmonics.

It is desirable to reduce or minimize the amplitude of the AM signal, which interferes with detection of targets. Slight changes in the LO center frequency can have a dramatic effect on the amplitude of the AM signal. In systems where the LO center frequency is not restricted to a single, specific frequency, the LO center frequency may be adjusted slightly to minimize the AM signal.

In an embodiment of the subject invention, the IF level can be monitored while sweeping the frequency of the system through at least a portion of the frequency range of the system. A peak-to-peak IF level detector can monitor the IF level of the detected FMCW radar signal as the sensor automatically scans a pre-determined portion of the LO center frequency band. In a specific embodiment, the system is then set to the frequency that produces the minimum IF level, which is the frequency that produces the minimum AM signal level. FIG. 2 represents the results of such a scan where the IF level is plotted with respect to frequency. The minimum IF level for the scan of FIG. 2 was found to be at 5.724 GHz.

Embodiments of the invention pertain to techniques for expediting the adaptation of the comb filter to the signal when the system is turned on. A number of different methods may be used to more rapidly match the DAC output to the total signal. In an embodiment, using a successive approximation technique, the DAC output can match the total signal in a few cycles of the modulation frequency. In another embodiment, the DAC is adjusted by half of the remaining unknown range during each cycle, which requires only one cycle per resolution bit to adapt. For example, a 10 bit DAC would only require 10 modulation cycles to fully adjust to the total signal. Other less efficient embodiments can adjust the DAC by less than half of the remaining unknown range during each cycle and can be utilized in specific circumstances.

A primary objective of a radar sensor is to maximize detection while simultaneously minimizing false alarms. Many radar sensors create range-Doppler maps (RDMs) in which the amplitude values of each cell represent potential target detects. When no targets are present in the sensor environment, the amplitude values in each cell are proportional to the noise and clutter background detected by the radar. What targets are present in the radar environment, these may appear in the cells of the range-Doppler map with somewhat larger amplitude, depending on the target size, distance from the radar and other factors. A radar system may utilize a digital signal processor (DSP) to perform the necessary signal processing tasks to create the RDM. This signal processing may be performed with fast Fourier transform (FFT) techniques or other techniques. In radar systems employing DSPs, computational power and memory may be limited.

In an embodiment, in order to reduce the number of detection calculations a processor performs every frame, a method of quickly determining the largest peaks in the RDM is implemented. Setting a static threshold for the prescreener is not desirable because of sensor changes, gain changes, location changes, and manufacturing variations between sensors may cause many potential targets to be eliminated. Statistical methods can be used in accordance with the invention to reduce the impact of these factors and improve performance.

Embodiments of the subject invention relate to a method for processing a radar signal that classifies two or more targets. A specific embodiment of a method for processing the radar signal classifies a human target or other target(s) using amplitude values in time-consecutive range-Doppler maps. This method first detects and tracks the target(s) in range using successive range-Doppler maps. Next, a spectrogram by concatenating all Doppler cells at each tracked target range value resulting from detection and tracking of the targets. Conditional probabilities are then formed using, as a vector, the features range, absolute value of velocity, amplitude, and the spectral widths of the spectrograms using distribution function formed by training vectors based on the same features. A classification decision is then based upon a comparison of the conditional probability to the total probability.

Embodiments of the invention pertain to a method for processing a radar signal for improving the performance of FMCW detection, tracking, and classification algorithms. Embodiments improve such performance by increasing the SNR and velocity measurement resolution of slow moving targets while minimizing DSP computational and memory requirements in two-dimensional FFT range-velocity processing. Embodiments of the invention involve a method of improving the velocity resolution and SNR needed for subsequent processing of slower moving targets without incurring the computational and memory expense of processing the entire velocity range of the RDM with the required higher velocity resolution. These results can be achieved by eliminating excessive computation for high-velocity targets.

DETAILED DISCLOSURE

Figure 1:
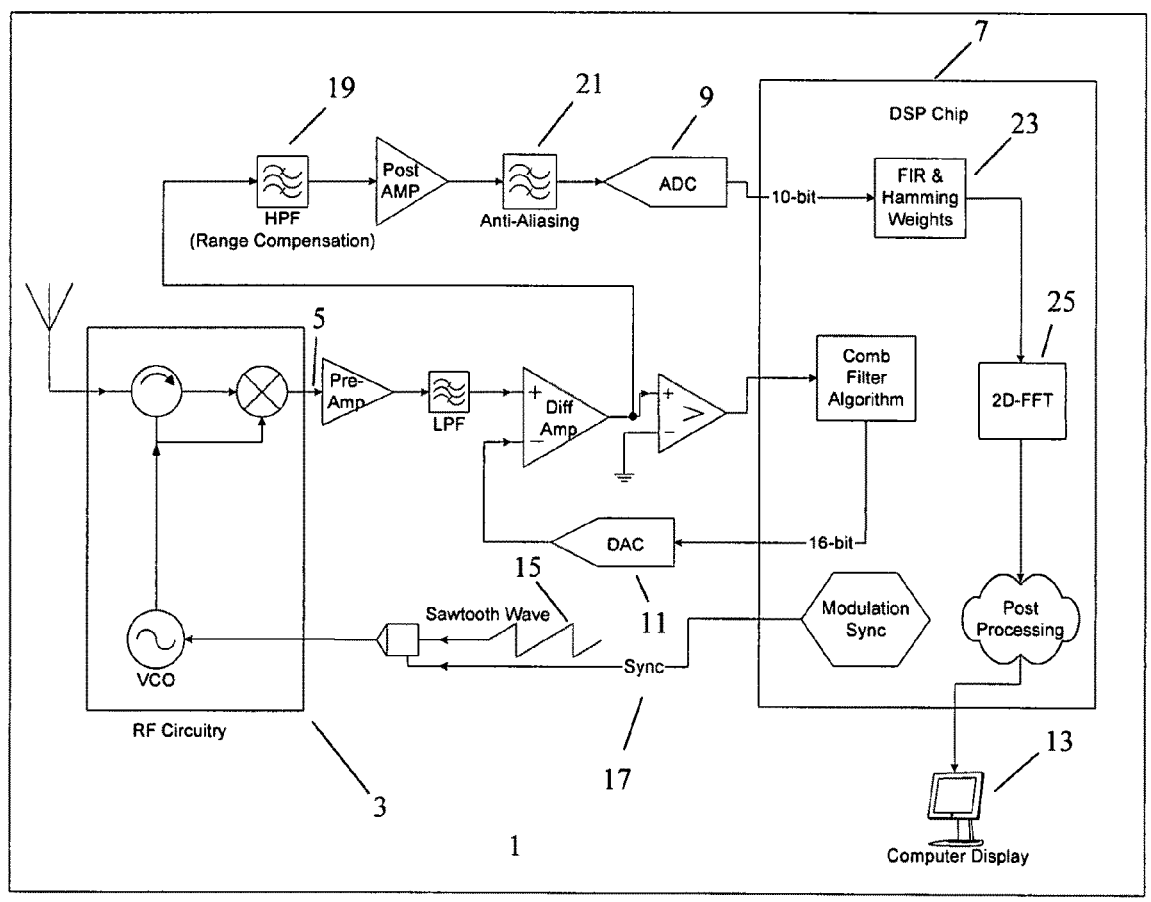
FIG. 1 shows a block diagram of an embodiment of a frequency modulation continuous wave (FMCW) system in accordance with the subject invention.

The block diagram in FIG. 1 shows an embodiment of a FMCW system 1 in accordance with the subject invention. The FMCW system processes a receive signal 5 after homodyne detection 3 in the RF circuitry. Amplification and filtering are done in the analog domain before the signal reaches the digital signal processor (DSP) 7. Amplification and filtering are done while minimizing noise, as the signal strengths are expected to be very low at longer ranges for the detection signal. The DSP can control all of the timing of the system so that all components run off the same system clock and are always in synchronism.

A key component of this system is the DSP 7. In a specific embodiment, this processor can do all of the Fast Fourier Transform (FFT) processing and can also do any other digital tasks required in the system. In an embodiment, the DSP is flexible and can be programmed quickly and easily. Before the DSP analyzes the receive signal, the receive signal is first amplified and then converted to a digital signal with an analog-to-digital converter (ADC) 9. A digital-to-analog converter (DAC) 11 in the system is used to implement a comb filter that helps to remove unwanted amplitude modulation on the received signal. Once the signal is input to the DSP, processing can be done to produce a range/velocity map. This range/velocity map can then be analyzed to detect targets. The results are sent from the DSP to a computer 13 so that they can be displayed and analyzed.

In an embodiment, the system generates a sawtooth waveform 15 for frequency modulation. This sawtooth waveform can also be synchronized with the DSP. The generation of the sawtooth waveform can be implemented with an analog ramp generator that is reset by a DSP signal 17. When the DSP sends out the sync signal, the ramp is reset. The ramp can be attenuated or offset from zero. Attenuating and/or offsetting the ramp allows control of the center frequency and bandwidth of the FMCW signal.

Mixer imbalance typically causes the mixer output to have amplitude modulation (AM) in addition to the desired beat frequency signal. AM is always in synchronism with the modulation and, therefore, all of its frequency components will be harmonics of the modulation. The AM is in general much larger than the target signals and should preferably be removed before amplifying to prevent clipping in the high gain stages that follow. In an embodiment, a comb filter can be used here to remove most, if not all, harmonics of the modulation that may be in the signal. This will remove the AM and any clutter, where clutter can refer to signals due to stationary targets.

With respect to the FMCW system shown in FIG. 1, the received signal strength varies with target distance and size. In an embodiment, the front-end amplifier can handle this dynamic range and the DSP can process multiple targets simultaneously. The received power due to range varies between $1/R^2$ or $1/R^4$ (with and without ground plane). For the 3 m-100 m range, as an example system, the dynamic range would be 30.5 dB or 61 dB in each case. In an embodiment, an ADC can have 11-bits to accommodate 61 dB of dynamic range. Therefore, it can be advantageous to reduce this dynamic range before it gets to the ADC. In order to reduce the dynamic range, a high-pass filter 19 can be used and can drastically reduce the dynamic range. In an embodiment, a $2^{nd}$ order high-pass filter approximates $R^4$ for frequencies below its center frequency. Since the frequency of the signal is range dependent, the filter can be set to produce the most gain for the highest frequency (greatest distance). Even though the filter does not implement an exact $R^4$ response with frequency and does not compress the dynamic range completely, the filter can reduce the variation to 5 or 10 dB. In an embodiment, $1^{st}$ Order high pass filter can be used when the range response is $1/R^2$.

In an embodiment, an analog low-pass filter 21 can be used in the system to reduce aliasing in the ADC. Noise and out of band interference can cause undesirable results without this filter.

Once the signal has been sampled with the ADC, the DSP processes it and generates target information. The signal is filtered and weighted 23 before being passed to the 2D-FFT 25. After the FFT is performed the magnitude can be calculated for each point and a range/velocity map can be created. This map can be displayed on a computer 13 to show the range and velocity of targets. Additional target detection processing can be implemented in DSP algorithms. Examples would include analysis of multiple maps and target tracking.

In an embodiment, when performing an FFT, special attention is paid to sidelobes or "leakage". A single target frequency can show a response in multiple bins. Although the sidelobes are at a lower magnitude they can be large enough to mask other low power frequency responses near large responses. In an FMCW system, this can make detecting multiple targets more difficult. In an embodiment, to address this problem, weighting can be used to reduce the sidelobes. In a specific embodiment, Hamming weights may be applied over the samples in each period and then over each set of samples used for computing the second (Doppler) FFT. Such weighting can result in the reduction of sidelobes in both range and velocity.

The DSP 7 can also perform a 2D-FFT. The results of the 2D-FFT can be used to form a range/velocity map that can be used to detect targets. As an example, the collected data may include 256×64 real valued samples (256 points collected for 64 periods of the modulation).

When an FFT is performed on real data, the result is complex and symmetric. In an embodiment, a special version of the FFT can be used. This special version of the FFT can eliminate the symmetric portion and result in a significant performance increase. The result of the 256-point "real FFT" is 128 complex points. The data requirement is the same since the complex numbers require 2 locations for each point (real and imaginary). In an embodiment, this 256-point FFT can be done 64 times, each one giving range information. A standard complex FFT can be done on the resulting data to finish the 2D-FFT. This 64-point complex FFT can be done 128 times, giving the velocity information. Both the real and complex FFTs can be done "in-place", writing over the original data with the results in order to keep the memory requirement low. Finally, the magnitude of each complex number can be computed for the range/velocity map. Each complex point can be replaced with a single magnitude value. In an embodiment, the final output is a range/velocity map with a size of 128×64. If decimation is used, the 256 original samples can be reduced, but the 64 periods need not be.

In an embodiment, the DSP can process the FFT output to perform target detection. The peaks of the range/velocity surface can be computed to detect target locations. In an embodiment, each peak can be tested to see if its value is above a certain threshold, set, for example, at a desired signal-to-noise ratio (SNR). If the peak is above the threshold, it can be highlighted on the range/velocity map. These points could also be fed to a tracking algorithm or sent to another system.

In an embodiment utilizing a frequency modulation continuous wave (FMCW) system, such as the system shown in FIG. 1, there is present in the mixer's intermediate frequency output (IF-output) remnants of the modulation frequency. These remnants are commonly referred to as amplitude modulation (AM) or AM noise. There are multiple causes for the AM signal, but common sources include mixer local oscillator (LO) to IF coupling, transmit antenna to receive antenna coupling, and reflections from nearby stationary clutter. The AM waveform shape is stable or slowly changing and is a function of the modulation frequency and its harmonics.

It is desirable to reduce or minimize the amplitude of the AM signal, which interferes with detection of targets. Slight changes in the LO center frequency can have a dramatic effect on the amplitude of the AM signal. In systems where the LO center frequency is not restricted to a single, specific frequency, the LO center frequency may be adjusted slightly to minimize the AM signal.

Figure 2:
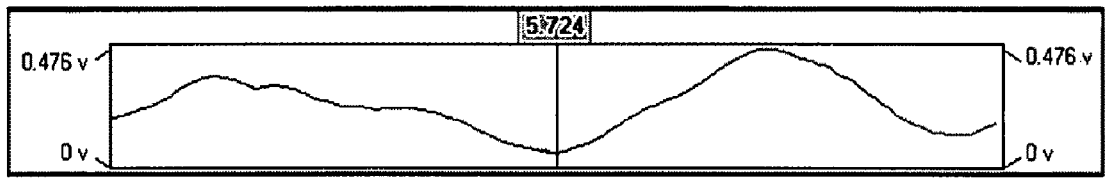
FIG. 2 shows the results of a scan where the sensor automatically scans a pre-determined (LO) local oscillator center frequency band while measuring the (IF) intermediate frequency level and then selects the frequency that produces the minimum AM signal level, where IF level is plotted with respect to frequency.

In an embodiment of the subject invention, the IF level can be monitored while sweeping the frequency of the system through at least a portion of the frequency range of the system. A peak-to-peak IF level detector can monitor the IF level of the detected FMCW radar signal as the sensor automatically scans a pre-determined portion of the LO center frequency band. In a specific embodiment, the system is then set to the frequency that produces the minimum IF level, which is the frequency that produces the minimum AM signal level. FIG. 2 represents the results of such a scan where the IF level is plotted with respect to frequency. The minimum IF level for the scan of FIG. 2 was found to be at 5.724 GHz.

Figure 3:
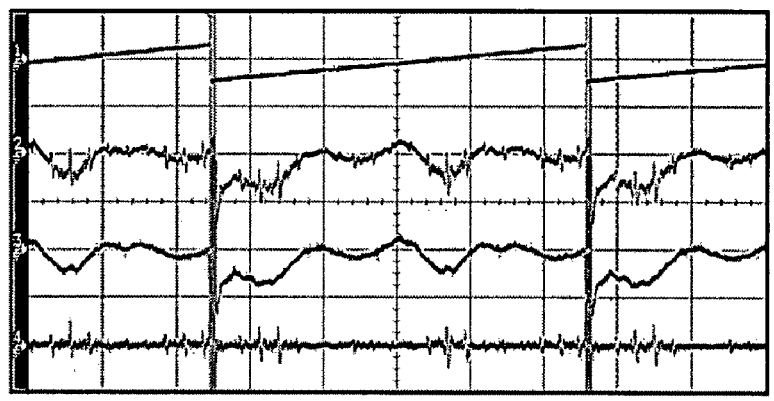
FIG. 3 shows four traces, where trace 1 is the sweep of frequency, trace 2 is the detected FMCW signal, trace 3 is an output signal of the digital-to-analog converter (DAC), which produces an output waveform that matches the AM waveform, and trace 4 is the variation signal to be detected.

In an embodiment of the invention, a sensor incorporates a digital comb filter used that takes a finite period of time to adapt to the amplitude modulation (AM) waveform that it is attempting to remove. This can be accomplished by using a digital-to-analog converter (DAC) 11, which produces an output waveform that matches the AM waveform. Such an output waveform is shown in trace 3 of FIG. 3, where trace 1 shows a sweep of the frequency. The DAC output of trace 3 is subtracted from the total detected FMCW signal of trace 2 to achieve a signal having the information of interest in trace 4.

The DAC output shown in trace 3 begins at a fixed DC level when the system is first turned on, and adapts to the AM waveform over time. This adaptation time typically does not exceed ten seconds. However, in some applications, such as radar, even adaptation times of this length are undesirable, as the system is often turned on only briefly when a target is suspected. Preferably, verification by the sensor can be provided in a shorter length of time, such as a few seconds. In this case, it is preferable that the comb filter adapt to the AM waveform as quickly as possible. Generally, the adaptation process permits a single bit level change in the DAC output for each point of the waveform during each cycle of the modulation signal. This limitation on the allowable rate of change of the DAC output is desirable during normal operation so that the comb filter does not adapt too rapidly to the signal. For example, if the comb filter adapts too rapidly to the signal during a target detection application, moving targets may get filtered out.

Because the AM signal is frequently large in amplitude in relation to the target signal, considerable adaptation time can be saved by making the DAC output waveform conform more rapidly to the shape of the total signal shown in trace 2 (AM plus targets) when the system is first turned on. The DAC output waveform can then be allowed to adapt under normal operation of, for example, one bit level per modulation cycle. In a short time after entering normal operation, the targets are removed from the output waveform of the DAC.

Embodiments of the invention pertain to techniques for expediting the adaptation of the comb filter to the signal when the system is turned on. A number of different methods may be used to more rapidly match the DAC output to the total signal. In an embodiment, using a successive approximation technique, the DAC output can match the total signal in a few cycles of the modulation frequency. In another embodiment, the DAC is adjusted by half of the remaining unknown range during each cycle, which requires only one cycle per resolution bit to adapt. For example, a 10 bit DAC would only require 10 modulation cycles to fully adjust to the total signal. Other less efficient embodiments can adjust the DAC by less than half of the remaining unknown range during each cycle and can be utilized in specific circumstances.

A primary objective of a radar sensor is to maximize detection while simultaneously minimizing false alarms. Many radar sensors create range-Doppler maps (RDMs) in which the amplitude values of each cell represent potential target detects. When no targets are present in the sensor environment, the amplitude values in each cell are proportional to the noise and clutter background detected by the radar. What targets are present in the radar environment, these may appear in the cells of the range-Doppler map with somewhat larger amplitude, depending on the target size, distance from the radar and other factors. A radar system may utilize a digital signal processor (DSP) to perform the necessary signal processing tasks to create the RDM. This signal processing may be performed with fast Fourier transform (FFT) techniques or other techniques. In radar systems employing DSPs, computational power and memory may be limited. An example shows a technique to prescreen a range-Doppler map to identify those cells that may have potential target detects.

Figure 4:
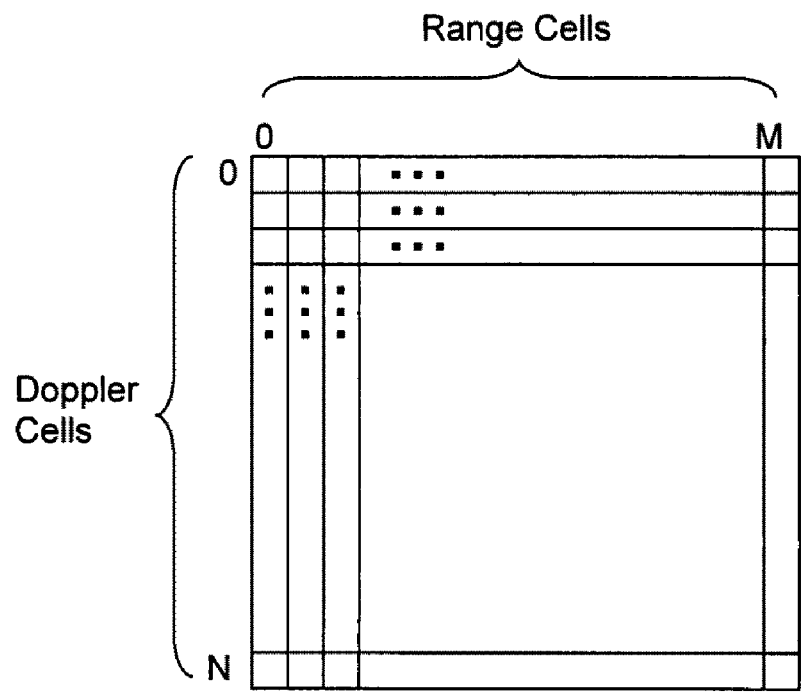
FIG. 4 shows a Range/Doppler Map (RDM).

A typical range Doppler map is illustrated in FIG. 4. In this case the range-Doppler map contains M range cells and N Doppler cells.

With sufficient processing power, every single range cell on a range/Doppler map can be input into a detection algorithm, resulting in an output which looks similar to the original map, but detects are filtered (this is the ideal case, but computationally expensive).

As an example, if M=N=64, the processor could test every cell to determine if it is noise or a target. This would require 64×64=4096 calculations for a single RDM during each frame or coherent processing interval (CPI). For a given computational power and memory, the mathematical calculations required by the detection algorithm may be difficult, or impossible, to accomplish with fast update rate sensors (milliseconds or less). In an embodiment, to address this potential real-time limitation, a method to quickly locate the largest "peaks" (largest cell with respect to amplitude) in the RDM is implemented before the final detection processing algorithm is employed for a target/no target decision. This reduces the number of cells that the detection algorithm must evaluate.

In an embodiment, in order to reduce the number of detection calculations a processor performs every frame, a method of quickly determining the largest peaks in the RDM is implemented. Setting a static threshold for the prescreener is not desirable because of sensor changes, gain changes, location changes, and manufacturing variations between sensors may cause many potential targets to be eliminated. Statistical methods can be used in accordance with the invention to reduce the impact of these factors and improve performance.

Equation 1 shows a statistical method where a threshold for each Doppler row (n) is calculated using the mean ($\mu$) and standard deviation ($\sigma$) of the cells in the row. In addition, the percentile (P) is used to increase the confidence interval and overall threshold. This method is used for each of the N Doppler rows to obtain the statistical thresholds. P is set to a numeric value to include a certain percentage, for example 99.9% (P=5), under benign conditions (no targets).

The mean $\mu_n$ is calculated for all N range cells for a particular Doppler cell row, n.

$$\text{Threshold}_n = \mu_n + P \cdot \sigma_n \quad (1)$$

The standard deviation, $\sigma_n$, is calculated using the method described equation 2:

$$\sigma_n = \sqrt{\frac{1}{M}\left(\sum_{i=1}^{M} x_i^2\right) - \bar{x}^2} \quad (2)$$

In equation 2, M corresponds to the number of range cells in the range-Doppler map. This method allows for quick computation of the standard deviation by reusing the sum of all $x_i$ terms which is also used in the computation of the mean. Although this method of computing the standard deviation can increase round-off error, it has been shown to be small for typical radar sensor data.

In an embodiment, in addition to the statistical threshold, a floor threshold is established. The floor threshold acts as a lowest threshold, such that if the computed threshold for a Doppler row is lower than the floor, then the threshold is set to that floor. The floor can be set to some numerical value by empirical tests of the data or via some other technique. In an embodiment, the floor can be set to the lowest amplitude in benign conditions for certain data.

In a specific embodiment, the threshold for each Doppler row is as follows:

$$\text{Threshold}_n \geq \text{Floor} \Rightarrow \text{Threshold}_n = \mu_n + P \cdot \sigma_n$$

$$\text{Threshold}_n < \text{Floor} \Rightarrow \text{Threshold}_n = \text{Floor} \quad (3)$$

Figure 5:
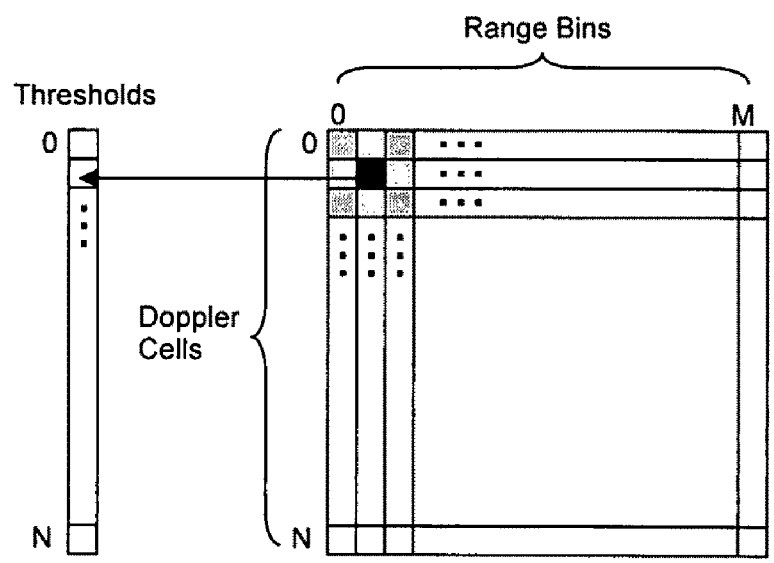
FIG. 5 shows locating local maximum in the RDM and comparing amplitude to its Doppler cell threshold (cell color indicating amplitude intensity).

In a specific embodiment, once the thresholds is determined, each cell's amplitude in the RDM is compared to the threshold. Cells with an amplitude greater than the threshold are then checked to see whether or not they are a local maxima with respect to adjacent cell amplitudes. In an embodiment, for a cell in the RDM to be considered a local maximum, the amplitude of that cell is larger than the amplitude of the 8 surrounding cells. FIG. 5 shows a cell location at [1,1] that has an amplitude that is higher than that of its 8 neighbors, surrounding. In other embodiments, alternative criteria can be applied to determine local maxima.

In this example, since the cell is in Doppler cell 1, the threshold from that Doppler row is used for the comparison. This threshold takes on the value of either the computed statistical threshold for that cell's Doppler row, or the value of the predetermined "floor" value at the cell's location, depending on which is greater in value. If the cell passes both of these tests (passing the statistical threshold and is a local maxima), the cell is considered to be a possible detect for future detection algorithm processing. This methodology greatly reduces the number of calculations a processor has to make for subsequent processing by a detection algorithm. Few false detects occur and most actual target detects are passed on by the prescreener algorithm.

Target detections are first created in the range-Doppler map of FIG. 4 every frame or coherent processing interval (CPI), using a detection algorithm designed to maximize target detections and minimize false alarms. Using amplitude values from the cells of the successive range-Doppler maps, a tracking algorithm can attempt to track targets. Certain targets will form target tracks every frame, for some number of frames.

Figure 6:
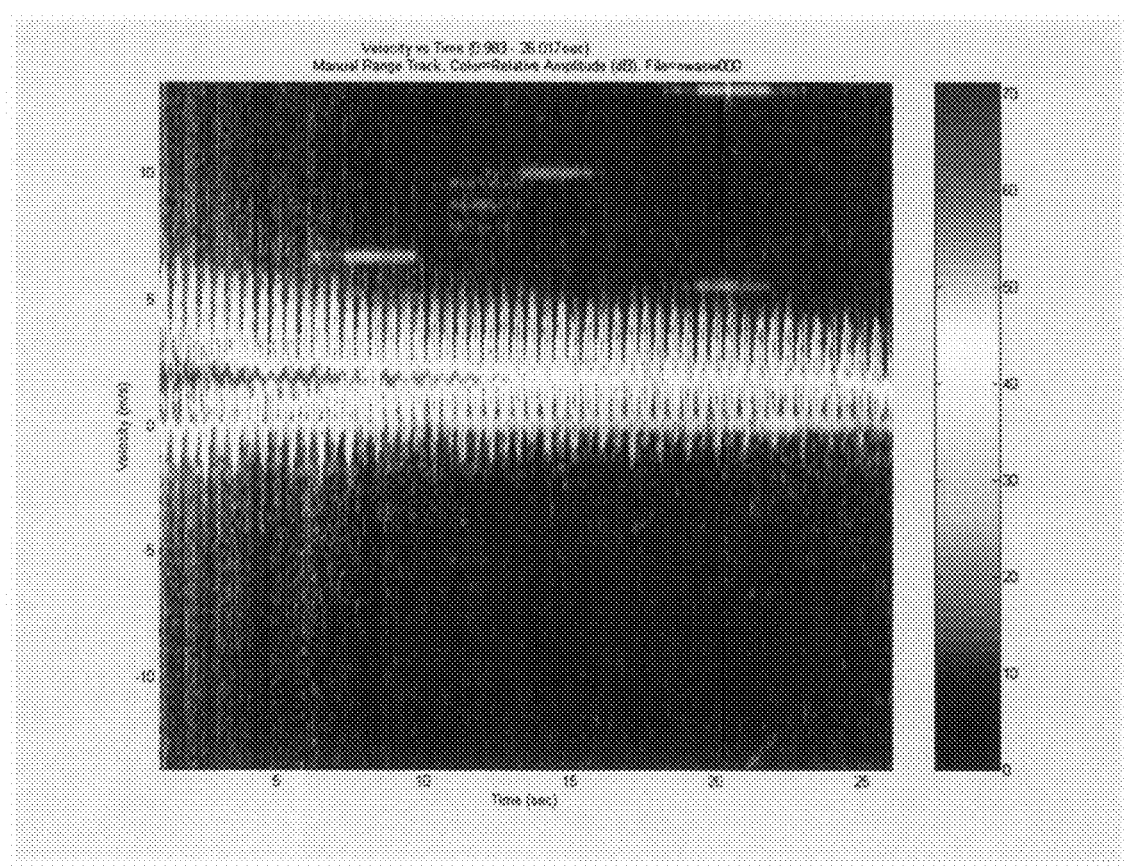
FIG. 6 shows a spectrogram of a walking human.

Once a target track is initiated, a spectrogram (Doppler velocity versus time) time array can be created by concatenating Doppler "slices" or columns in the RDM, chosen at the tracked target's range for the current frame. An example spectrogram for a walking human target is shown in FIG. 6.

The target features, such as range, absolute value of velocity, amplitude, and/or spectral width (see below and example) can be used to evaluate the conditional probability that the target is a human target or some other target. To calculate the conditional probability the feature vector can be tested with a multi-variate Gaussian model approximating the distribution function associated with the feature parameters.

Figure 7:
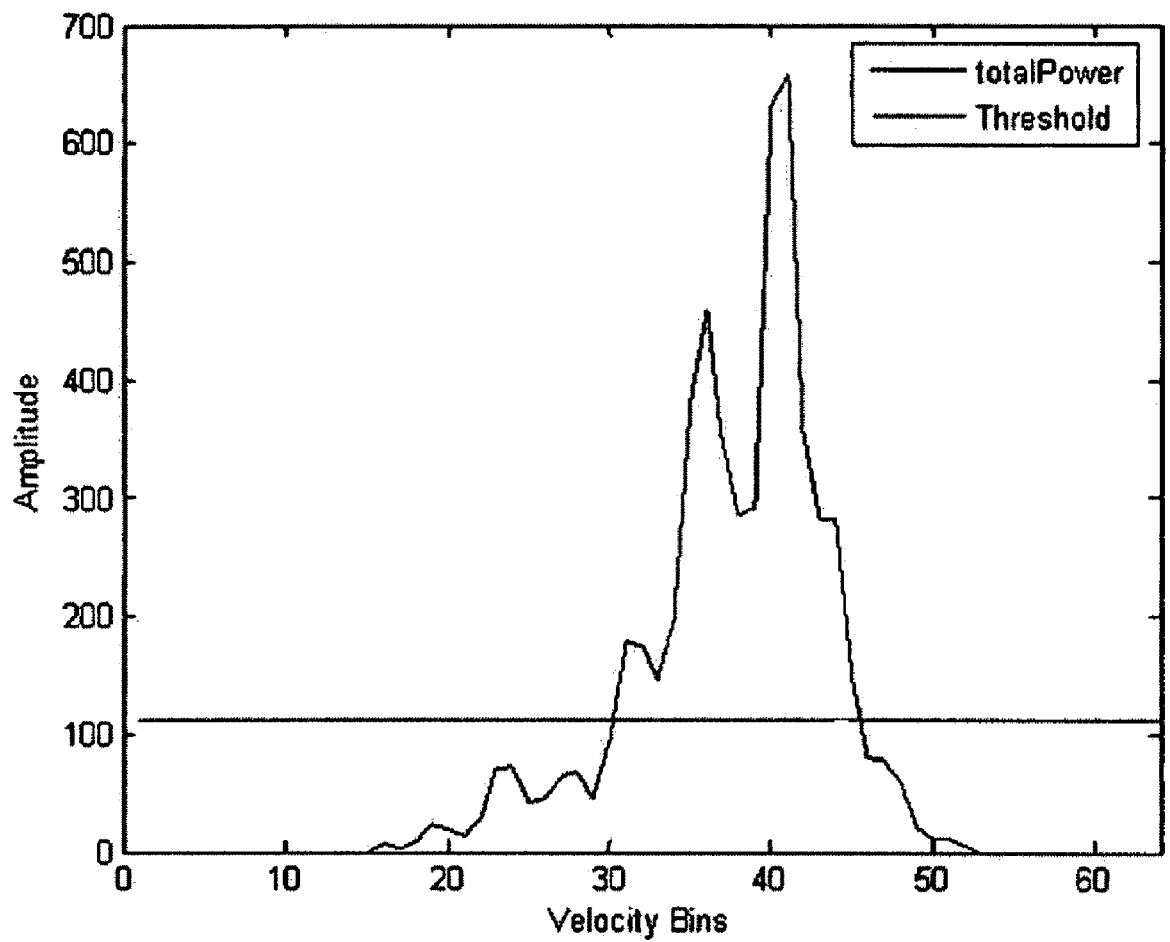
FIG. 7 shows an example of total power.

Range, velocity, and amplitude can be obtained directly from the RDM but it is necessary to calculate the average spectral width of the current "slice" or Doppler column and append it to previous slices. Spectral width can be computed as follows. First, a running sum (total power) is computed across each row in a spectrogram buffer (this includes the current slice and all of the previous slices for a given target). A threshold of, for example, 1.25 times the average of the total power, is set as shown in FIG. 7. For every bin that the total power is greater than the threshold, a counter is incremented. This counter effectively becomes the spectral width of the spectrogram for the track at that particular frame.

As long as the same target continued to be tracked, the procedure of spectrogram building and spectral width computations repeat until the target fills $N_s$ frames of data. At that point, the spectrogram is complete for that target and the processing continues to gather another set of $N_s$ frames of data, if possible, for the next target track.

The number of spectrogram frames, $N_s$, depends on the frame rate; since the periodicity within the spectrogram is typically as low as 0.5 to 1 Hz, better estimates of spectral width are made with $N_s$ X frame time=1 to 2 seconds (frame time=1/(frame rate)). Once the first $N_s$ frames of spectrogram slices have been collected, it is possible to form a running average to calculate the spectral width, where the oldest slice is discarded and one new slice is added. By so doing, a conditional probability estimate may be obtained every frame and an estimate of the target class can be performed. Generally, using a longer time interval will improve the estimated conditional probability and estimate of target class. The spectral width feature described above may be computed with less than 1 to 2 seconds of spectrogram data for a human target with some loss in conditional probability.

The last step in the classification algorithm can be to compare the conditional probability for the target class to the total probability determined for all classes. This comparison may be used as a basis for a target classification decision.

An embodiment of the invention relates to a technique for classification between two or more targets. In an embodiment, two target "classes" are assumed, namely human and vehicle classes. The embodiment can involve generating a multivariate probability density function (pdf) for both the human class and the vehicle class using training samples of radar-derived information. Radar data from targets-in-question can be evaluated using the generated human/vehicle probability density functions to determine corresponding class probabilities.

The aforementioned terms 'radar data' and 'radar-derived information' are directed to a specific instance of the more general term 'features', which is commonly used in classification literature. Examples of features that are relevant to this application are range, velocity, amplitude (which is proportional to radar cross section) and spectral width. The goal in feature selection is to determine features that best distinguish the vehicle class from the human class in a robust manner.

After selecting which features to be used, a determination of the probability of each class is made given the observed sample of features. The following is a description of such determination.

Let $\omega_1$=human class and $\omega_2$=vehicle class.

Let X be a random variable that represents a vector of features.

Let x be a particular sample of X.

A determination of the probabilities $P(\omega_i|x)$ for i=1,2 is made. We can rewrite this expression using Bayes' Theorem as follows.

$$P(\omega_i | x) = \frac{f_i(x | \omega_i) P(\omega_i)}{f(x)}, \quad (4)$$

where $f_i(x|\omega_i)$ is the class conditional likelihood function of X, $f(x)$ is the probability density function of X, and $P(\omega_i)$ is the probability mass function of $\omega_i$. Using total probability, the above may be rewritten as $$P(\omega_i \mid x) = \frac{f_i(x \mid \omega_i)P(\omega_i)}{f_1(x \mid \omega_1)P(\omega_1) + f_2(x \mid \omega_2)P(\omega_2)}. \quad (5)$$

Assuming the equiprobable case (human or vehicle), i.e. $P(\omega_1)=P(\omega_2)$, the above simplifies to $$P(\omega_i \mid x) = \frac{f_i(x \mid \omega_i)}{f_1(x \mid \omega_1) + f_2(x \mid \omega_2)}. \quad (6)$$

This states that the posterior class probability is equal to the likelihood function of X conditioned on the corresponding class, divided by the sum of the likelihoods. Hence, the determination simplifies to modeling $f_1(x|\omega_1)$ and $f_2(x|\omega_2)$.

An approach to modeling conditional probabilities, conditioned on the corresponding class, is to use Gaussian Mixture Modeling (GMM). This technique works by assuming the density function to be modeled can be approximated sufficiently well as a weighted sum of k Gaussian component densities. The likelihood of a sample set of training data (i.e. feature vectors) may be maximized by, for example, performing Expectation Maximization on the weights, means and covariance matrices of each component. Performing Gaussian Mixture Modeling using training data generated from the human class yields $f_1(x|\omega_1)$; similarly, using training data from the vehicle class yields $f_2(x|\omega_2)$.

As radar data is acquired by the radar for a tracked target, the features needed to create a feature vector (range, velocity, amplitude, and spectral width) can be obtained each frame. Using the modeled PDFs, conditional probabilities are calculated as explained above and a probability estimate that the target is either a human or vehicle class may be obtained from equation 6 above.

Embodiments of the subject invention relate to a method for processing a radar signal that classifies two or more targets. A specific embodiment of a method for processing the radar signal classifies a human target or other target(s) using amplitude values in time-consecutive range-Doppler maps. This method first detects and tracks the target(s) in range using successive range-Doppler maps. Next, a spectrogram by concatenating all Doppler cells at each tracked target range value resulting from detection and tracking of the targets. Conditional probabilities are then formed using, as a vector, the features range, absolute value of velocity, amplitude, and the spectral widths of the spectrograms using distribution function formed by training vectors based on the same features. A classification decision is then based upon a comparison of the conditional probability to the total probability.

In FMCW radar systems, a linearly swept carrier frequency may be transmitted and subsequently mixed via homodyne mixer with the received signal reflections from targets and clutter in a radar scene. An example of such a system is shown in FIG. 1. This process can produce a signal (IF) having frequencies that correspond to the time delay between the instantaneous transmit frequency and frequencies of the delayed versions of the transmit signal reflected from objects in the scene and received by the radar. The carrier frequency is typically swept over some bandwidth repeatedly at a certain rate referred to as the modulation rate (FM rate). The bandwidth used determines the resolution with which targets can be discriminated in the return signal while the FM rate determines the maximum velocity of targets that can be unambiguously detected. The IF signal will repeat at the FM rate having beat frequencies that specify target range that rotate in phase at a rate that corresponds to the target velocity. Analysis of the IF signal can involve digitizing the signal in sequences of length equal to the FM period and at a sample rate great enough to handle the IF bandwidth.

Figure 8:
FIG. 8 shows frequency analysis being used to determine target range, where the number of samples in the frequency modulation (FM) period and therefore range, is designated M.
Figure 9:
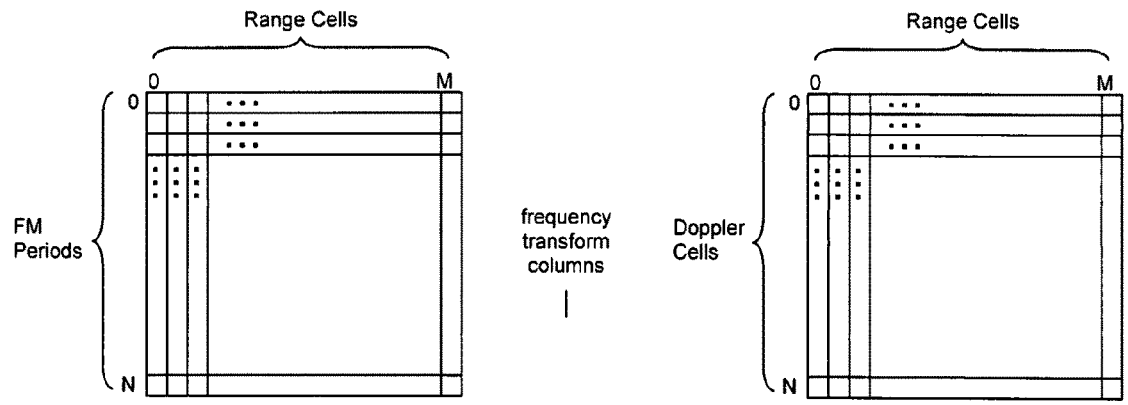
FIG. 9 shows the radial velocity of targets, where N designates the number of FM periods.

Frequency analysis is then used to determine target range as illustrated in FIG. 8, where the number of samples in the FM period and therefore range is designated M. The beat frequency corresponding to each range cell rotates in phase at the Doppler rate as a result of target radial velocity, so the range responses from successive modulation periods may be stacked together in a two-dimensional array such that frequency analysis of each range cell versus time or FM period will specify the radial velocity of targets as shown in FIG. 9, where N designates the number of FM periods. The magnitude of this two-dimensional range versus velocity data array is referred to as a range-Doppler map (RDM).

This RDM is subsequently provided to detection, tracking, classification, possibly other algorithms to find targets and estimate target parameters. The performance of subsequent algorithms often benefits considerably in the detection, tracking, classification, etc. of slower moving targets when provided better velocity resolution and SNR in the RDM. Improved velocity resolution and SNR in FIG. 9 may be obtained by increasing the number of FM periods, N, in the map and performing the target velocity frequency/Fourier analysis over this larger number of points. This, however, greatly impacts practical implementation in hardware by significantly increasing the memory requirements for storage of the RDM and the computation requirements for performing the frequency analysis. Improving the velocity resolution by a factor of P would involve P times the memory requirements and frequency analysis on a P times longer sequence for every processed range cell.

Embodiments of the invention pertain to a method for processing a radar signal for improving the performance of FMCW detection, tracking, and classification algorithms. Embodiments improve such performance by increasing the SNR and velocity measurement resolution of slow moving targets while minimizing DSP computational and memory requirements in two-dimensional FFT range-velocity processing. Embodiments of the invention involve a method of improving the velocity resolution and SNR needed for subsequent processing of slower moving targets without incurring the computational and memory expense of processing the entire velocity range of the RDM with the required higher velocity resolution. These results can be achieved by eliminating excessive computation for high-velocity targets. A specific embodiment of the method involves first buffering each FM period of sampled data synchronously with the modulating waveform; then computing the frequency content of the homodyne mixer beat waveform for the buffered data of each FM period using Fourier analysis and stacking the resulting one-dimensional complex valued data into a two-dimensional buffer; then filtering, decimating, and then buffering each frequency value versus time in the two-dimensional data array into a secondary two-dimensional data buffer; performing Fourier analysis of each frequency value versus time in the first two-dimensional data buffer while performing Fourier analysis of each frequency value versus time in the secondary two-dimensional buffer at a decimated frame rate; computing the magnitude of the complex values in both two-dimensional arrays to provide a range versus Doppler frequency map in the first two-dimensional array having lower Doppler frequency resolution and a higher maximum target velocity and a second range versus Doppler frequency map in the second two-dimensional array having higher Doppler frequency resolution, higher SNR, and a lower maximum target velocity.

Figure 10:
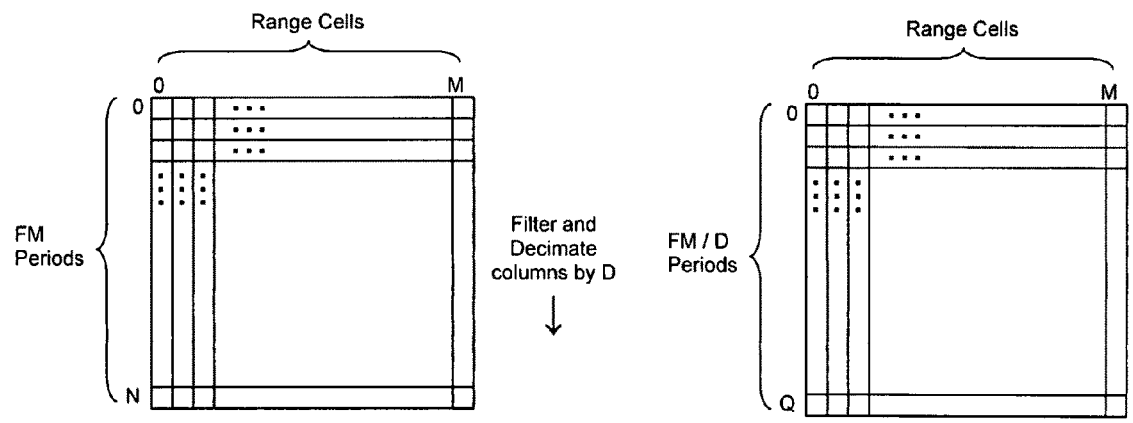
FIG. 10 shows the range cell data versus FM period/time for each range value anti-alias filtered, decimated by some factor D, and buffered into a secondary memory array.
Figure 11:
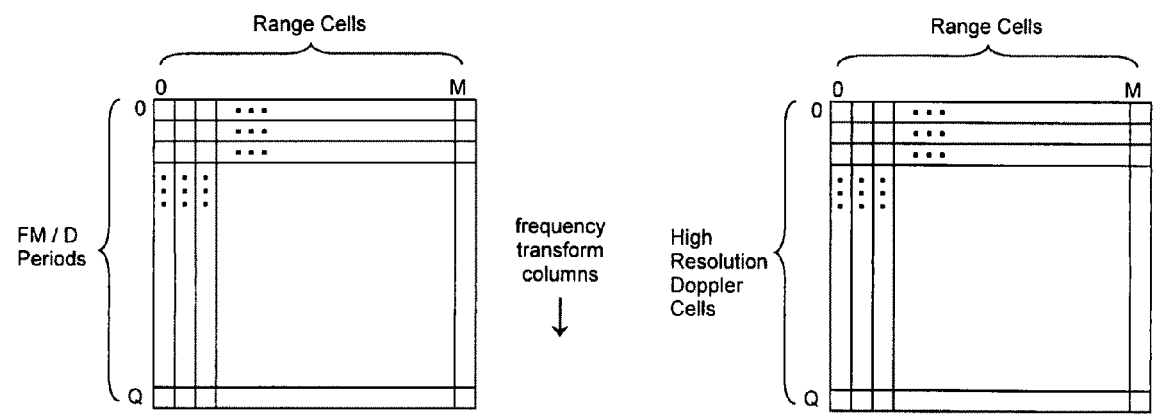
FIG. 11 shows the two-dimensional buffer filled for some number of periods, Q.

In this procedure, the processing of the original high maximum velocity, low velocity resolution RDM can be processed as previously described. However, following the frequency analysis of the sample data into range cells and the stacking of range data from subsequent FM periods, the range cell data versus FM period/time for each range value can be anti-alias filtered, decimated by some factor D, and buffered into a secondary memory array, as shown in FIG. 10. This two-dimensional buffer can then be filled for some number of periods, Q, as illustrated in FIG. 11. Frequency analysis can then be conducted for each of the range cells versus time at the lower sample rate of the buffered secondary data array, as shown in FIG. 11, where the velocity resolution has a factor of D*(N/Q) times that of the original RDM while the maximum target velocity in the high resolution map would be 1/D times that of the low resolution map. For the embodiment where N equals Q, the velocity resolution improves by a factor of D with only a factor of two memory requirements and with significantly lower computational requirements compared to processing the entire velocity range with D times the resolution. An additional benefit is that, if desired, the frequency analysis of the high resolution RDM can be performed less frequently for additional computation savings. The slower moving targets in the high resolution RDM can allow this slower update rate.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A method of processing a radar signal for classifying a target, comprising:
   detecting and tracking a target in range using successive range-Doppler maps;
   creating a spectrogram by concatenating all Doppler cells at each tracked target range value;
   forming conditional probabilities using, as a vector, the features range, absolute value of velocity, amplitude, and spectral width of the spectrogram, wherein forming conditional probabilities of the spectrogram comprises using a distribution function formed by training vectors based on the features range, absolute value of velocity, amplitude, and the spectral width of the spectrogram;
   and making a classification decision with respect to the at least one target based upon a comparison of the conditional probability to a total probability, wherein the spectral width of the spectrogram is computed by computing total power across each row in a spectrogram buffer that includes a current slice and the previous slices for the target, incrementing a counter each time the total power of a bin is above a threshold, wherein the counter is the spectral width of the spectrogram.

2. The method according to claim 1, wherein detecting and tracking at least one target in range using successive range-Doppler maps utilizes amplitude values from the cells of the range-Doppler maps.

3. The method according to claim 1, wherein the threshold is 1.25 times an average of the total power.

4. The method according to claim 1, wherein making a classification decision comprises making a classification decision between a human class and a vehicle class.

* * * * *

UNITED STATES PATENT AND TRADEMARK OFFICE
CERTIFICATE OF CORRECTION

PATENT NO. : 7,652,617 B2  Page 1 of 1
APPLICATION NO. : 11/809707
DATED : January 26, 2010
INVENTOR(S) : James Lynn Kurtz et al.

It is certified that error appears in the above-identified patent and that said Letters Patent is hereby corrected as shown below:

Column 9,
Line 9, "thresholds" should read --$threshold_n$--.

Signed and Sealed this

Sixteenth Day of March, 2010

David J. Kappos
*Director of the United States Patent and Trademark Office*